United States Patent [19]
Charbonneau et al.

[11] Patent Number: 5,393,848
[45] Date of Patent: Feb. 28, 1995

[54] PROCESS FOR FORMING IMPROVED LIQUID CRYSTALLINE POLYMER BLENDS

[75] Inventors: Larry F. Charbonneau, Mendham; Balaram Gupta, N. Plainfield; H. Clay Linstid, Clinton; Linda C. Sawyer, Chatham; James P. Shepherd, Springfield, all of N.J.

[73] Assignee: Hoechst Celanese Corp., Somerville, N.J.

[21] Appl. No.: 17,948

[22] Filed: Feb. 12, 1993

Related U.S. Application Data

[63] Continuation of Ser. No. 746,307, Aug. 14, 1991, abandoned, which is a continuation-in-part of Ser. No. 464,811, Jan. 16, 1990, abandoned.

[51] Int. Cl.$^6$ .................. C08L 67/03; C08L 67/04; C08L 77/12
[52] U.S. Cl. .................. 525/425; 525/420; 525/437; 525/439; 525/444; 525/450; 524/537; 524/538; 524/539
[58] Field of Search ............... 525/420, 425, 437, 439, 525/444, 450; 524/537, 538, 539

[56] References Cited

U.S. PATENT DOCUMENTS

| | | |
|---|---|---|
| 3,637,595 | 1/1972 | Cottis et al. . |
| 3,845,099 | 10/1974 | Economy et al. ............... 260/473 |
| 4,161,470 | 7/1979 | Calundann . |
| 4,184,996 | 1/1980 | Calundann . |
| 4,228,218 | 10/1980 | Takayanagi ............... 525/58 |
| 4,256,624 | 3/1981 | Calundann . |
| 4,267,289 | 5/1981 | Froix ............... 525/444 |
| 4,276,397 | 6/1981 | Froix ............... 525/448 |
| 4,330,457 | 5/1982 | East et al. . |
| 4,371,660 | 2/1983 | Calundann et al. . |
| 4,386,174 | 5/1983 | Cogswell ............... 524/27 |
| 4,386,186 | 5/1983 | Maresca ............... 525/68 |
| 4,408,022 | 10/1983 | Cincotta ............... 525/444 |
| 4,414,365 | 11/1983 | Sugimoto ............... 525/437 |
| 4,429,078 | 1/1984 | Cogswell ............... 525/165 |
| 4,433,083 | 2/1984 | Cogswell ............... 524/27 |
| 4,442,057 | 4/1984 | Brody ............... 264/176 F |
| 4,451,611 | 5/1984 | Cincotta ............... 525/51 |
| 4,460,735 | 7/1984 | Froix ............... 524/537 |
| 4,460,736 | 7/1984 | Froix ............... 524/539 |
| 4,473,682 | 9/1984 | Calundann et al. . |
| 4,489,190 | 12/1984 | Froix ............... 524/539 |
| 4,539,386 | 9/1985 | Yoon . |
| 4,563,508 | 1/1986 | Cottis ............... 525/444 |
| 4,567,227 | 1/1986 | Kiss ............... 524/538 |
| 4,611,025 | 9/1986 | Akkapeddi ............... 524/449 |
| 4,725,647 | 2/1988 | Maresca ............... 525/68 |
| 4,778,858 | 10/1988 | Ginnings ............... 525/425 |
| 5,023,284 | 6/1991 | Cheung ............... 524/109 |

FOREIGN PATENT DOCUMENTS

| | | | |
|---|---|---|---|
| 0170067 | 2/1986 | European Pat. Off. | ...... C08L 71/00 |
| 0249226 | 12/1987 | European Pat. Off. | ... C08L 101/00 |
| 0278066 | 8/1988 | European Pat. Off. | ...... C08L 79/08 |
| WO88/00605 | 1/1988 | WIPO . | |

OTHER PUBLICATIONS

Synthesis and Structure of the P-Hydroxybenzoic Acid Polymer Journal of Polymer Science, vol. 14, 2207–2224 (1976).

Polyesters of Hydroxybenzoic Acids Journal of Applied Polymer Science, vol. II, Issue No. 5, pp. 198–202 (1959).

"Scheme II—Neighboring Group Participation in the Ring-Opening Polymerization of 1,6-Anhydro-2-0-benzoyl-3,4-di-0-benzyl-Beta-D-glacto-pyranose" (1), Maromolecules 1988, 21, 543–545, K. Kobayashi, et al.

"Anomalous Temperature Dependence of Viscosity of Thermotropic Polyester," Journal of Rheology, 30(3), 585–599 (1986), Gabor Kiss.

*Primary Examiner*—Patricia A. Short
*Attorney, Agent, or Firm*—James L. McGinnis

[57] ABSTRACT

An improved liquid crystalline polymer blend is produced by mixing a preformed thermotropic liquid crystalline polymer in the melt phase with reactants needed to form a second liquid crystalline polymer under conditions sufficient to form the second liquid crystalline polymer. The resulting blends are anisotropic and have improved morphology and improved melt processability. The method is particularly useful when the second liquid crystalline polymer is biphasic or is difficult to synthesize or process in the melt.

22 Claims, 5 Drawing Sheets

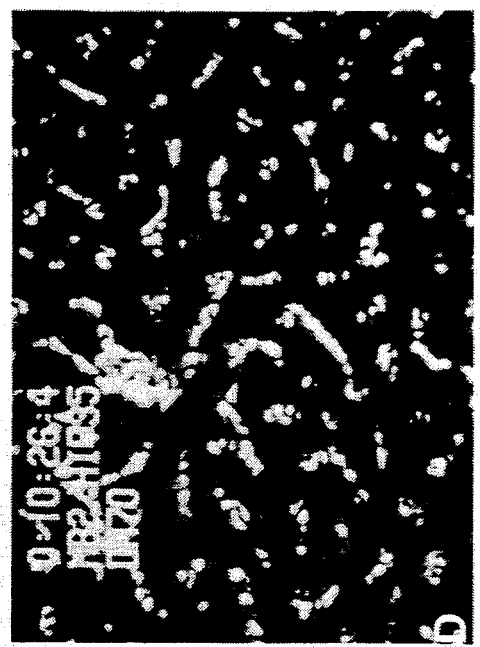
FIG. 2A
FIG. 2B
FIG. 2C
FIG. 2D

PROCESS FOR FORMING IMPROVED LIQUID CRYSTALLINE POLYMER BLENDS

This is a continuation of application(s) Ser. No. 07/746,307, filed on Aug. 14, 1991, now abandoned, which is a continuation-in-part of application Ser. No. 07/464,811, filed on Jan. 16, 1990, now abandoned.

BACKGROUND OF THE INVENTION

Poly[co(4-oxybenzoate/phenyleneisophthalate)] is a previously known polymer which is disclosed in U.S. Pat. No. 3,637,595. However, such polymer is recognized to be difficult to form on a uniform and reliable basis. Such difficulty can be traced to its inherent structural morphology wherein the polymer when melted forms a biphasic melt. Some regions within the melt form an ordered anisotropic melt phase at a given temperature range and other regions form a nonordered isotropic melt phase. The nonuniformity of the product of the prior art also commonly has led to formation of three-dimensional molded articles having widely varying properties. See, (1) "Anomalous Temperature Dependence of Viscosity of Thermotropic Polyesters", by Gabor Kiss appearing in the *Journal of Rheology* 30(3), Pages 585 to 599 (1986), and (2) "Pressure-Induced Phases in a Thermotropic Polyester" by B.S. Hsiao, M. T. Shaw and E. T. Samulski appearing in *Macromolecules*, 21, Pages 543 to 545 (1988).

Numerous blends of distinct polymeric materials have been disclosed in the past. However, it has been recognized that the characteristics of the resulting blends commonly cannot be predicted with certainty and require empirical testing since the interaction of the diverse polymer chains within the blend is complex. In U.S. Pat. No. 4,267,289 is disclosed a blend of two specific polymers which each form an anisotropic single phase melt. Representative disclosures of polymer blends of an anisotropic melt-forming polymer and an isotropic melt-forming polymer are present in U.S. Pat. Nos. 4,228,218; 4,276,397; 4,386,174; 4,408,022; 4,429,078; 4,433,083; 4,442,057; 4,451,611; 4,489,190; 4,567,227; 4,460,735; 4,460,736; 4,611,025; and in European Patent Application Nos. 0170067; 0249226; and 0278066. U.S. Pat. No. 4,414,365 discloses a bulk phenyleneisophthalate)] wherein the resulting product exhibits improved melt processability.

It is an object of the present invention to provide an improved process for the preparation of poly[co(4-oxybenzoate/phenyleneisophthalate)] wherein the resulting product exhibits anisotropic melt properties over a broader temperature range.

It is an object of the present invention to provide an improved process for the preparation of poly[co(4-oxybenzoate/phenyleneisophthalate)] wherein the product exhibits enhanced physical and mechanical properties.

It is another object of the present invention to provide a novel relatively inexpensive polymeric composition of matter which is capable of exhibiting an anisotropic melt phase and of reliably undergoing melt processing to form quality three-dimensional molded articles.

It is a further object of the present invention to provide a novel polymeric composition of matter which is capable of undergoing melt processing to form a three-dimensional article which exhibits a heat deflection temperature of at least 200° C. and a Notched Izod impact strength of at least 1.0 ft.-lb./in.

These and other objects, as well as the scope, nature and utilization of the claimed invention will be apparent to those skilled in the art from the following detailed description and appended claims.

SUMMARY OF INVENTION

A method is set forth for producing a liquid crystalline polymer blend. In this method, a preformed thermotropic liquid crystalline polymer in the melt phase is mixed with the reactants necessary to form a second liquid crystalline polymer at a temperature and for a time period sufficient for the reactants to combine, forming the second liquid crystalline polymer as a uniform blend with the preformed thermotropic liquid crystalline polymer.

The method is advantageous as it yields a unique product. For example, when the second liquid crystalline polymer is biphasic, such as poly[co(4-oxybenzoate/1,4-phenyleneisophthalate)], the resulting blend has improved morphology, both in the melt and as a solid, compared with the same polymer made in the absence of the preformed thermotropic liquid crystalline polymer. This method also is particularly advantageous for polymers which are difficult or impossible to synthesize or process in the melt. For example, the copolymer of 4,4'-biphenol, terephthalic acid and 4-hydroxybenzoic acid is readily synthesized and processed in the melt when it is made as part of a blend by the methods disclosed herein.

BRIEF DESCRIPTION OF THE PHOTOGRAPHS

In each instance, samples of the product were prepared for analysis by thin sectioning using a glass knife microtome. The resulting thin sections were held between quartz cover slips and were examined by standard dynamic thermo-optical polarized light microscopy to observe morphological behavior at elevated temperatures. The polymeric sections were heated from room temperature at a rate of 20° C./minute to a maximum temperature of 420° C. followed by rapid quenching. The results were video taped and micrographs were obtained from the video tape at room temperature (A), 285° C. (B), 345° C. (C), and 395° C. (D). The magnification was 750X, and the poly[co(4-oxybenzoate/phenyleneisophthalate] contained 35 mole percent of p-oxybenzoyl units, 32.5 mole percent of 1,4-dioxyphenylene units, and 32.5 mole percent of isophthaloyl units in each instance. The preformed Poly[co(4-oxybenzoate/6-oxynaphthoate)] contained 73 mole percent of recurring 4-oxybenzoyl units and 27 mole percent of recurring 6-oxynaphthoyl units.

FIGS. 1A, 1B, 1C and 1D illustrate typical sections of Poly[co(4-oxybenzoate/phenyleneisophthalate)] formed in accordance with the prior art. Coarse crystalline and finer liquid crystalline domains are apparent in the temperature range of 285 (FIG. 1B) to 345° C. (FIG. 1C). At 345° C. liquid crystalline domains are present in an isotropic melt. At 395° C. (FIG. 1D) the melt becomes mostly isotropic and is completely isotropic at 410° C.

FIG. 2 illustrates typical sections of the product of the present invention wherein approximately 1 percent by weight of preformed poly[co(4-oxybenzoate/6-oxynaphthoate)] was intimately admixed with the poly[co(4-oxybenzoate/phenyleneisophthalate)] at the time of its formation. The preformed poly[co(4-oxybenzoate/6-oxynaphthoate)] was intimately admixed with an equal part by weight of poly[co4-oxybenzoate/oxybenzoate/phenyleneisophthalate)] at the time of its introduction into the reactor. Such intimate admixture was achieved by preliminarily forming the poly[co(4-oxybenzoate/phenyleneisophthalate)] in the presence of the preformed poly[co(4-oxybenzoate/6-oxynaphthoate)] to form a masterbatch. Approximately two parts by weight of this masterbatch were added to approximately 98 parts by weight of the monomers. A finer microstructure than illustrated in FIG. 1 now is apparent. At 345° C. (FIG. 2C) the texture is finer and has a less coarse crystalling structure.

FIG. 3 illustrates typical sections of the product of the present invention similar to that illustrated in FIG. 2 with the exception that approximately 4 parts by weight of the masterbatch were added to approximately 96 parts by weight of the monomers, and approximately 2 percent by weight of the preformed poly[co(4-oxybenzoate/6-oxynaphthoate)] was intimately admixed with the poly[co(4-oxybenzoate/phenyleneisophthalate)] at the time of its formation. A further refinement of the microstructure than illustrated in FIG. 2 is apparent. Additionally, a finer dispersion is clear at 345° C. (FIG. 3C).

FIG. 4 illustrates typical sections of the preformed poly[co(4-oxybenzoate/6-oxynaphthoate)]. Uniform liquid crystalline domains are apparent over the 285° to 395° C. temperature range (FIGS. 4B, 4C, and 4D).

FIG. 5 illustrates typical sections of the product of the present invention similar to that illustrated in FIGS. 2 and 3 with the exception that approximately 10 parts by weight of the masterbatch were added to approximately 90 parts by weight of the monomers, and approximately 5 percent by weight of the preformed poly[co(4-oxybenzoate/6-oxynaphthoate)] was intimately admixed with the poly[co(4-oxybenzoate/phenyleneisophthalate)] at the time of its formation. A further refinement of the microstructure than illustrated in FIG. 3 is apparent. There is a liquid crystalline texture over the temperature range of 285° to 395° C. (FIGS. 5B, 5C, and 5D) which closely approaches that of the preformed polymer as shown in FIG. 4.

DESCRIPTION OF PREFERRED EMBODIMENTS

Figure 1A:
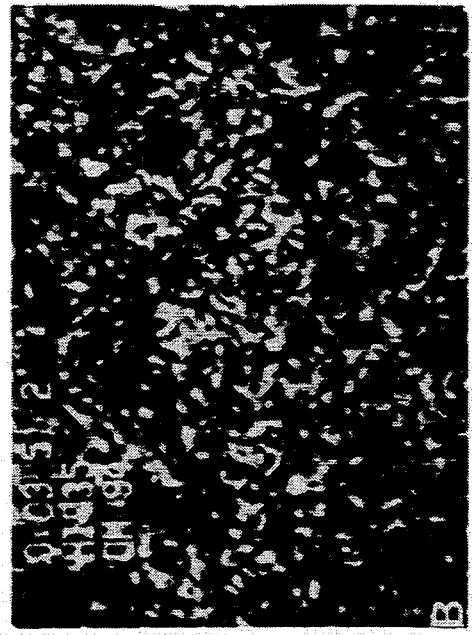
Figure 1B:
Figure 1C:
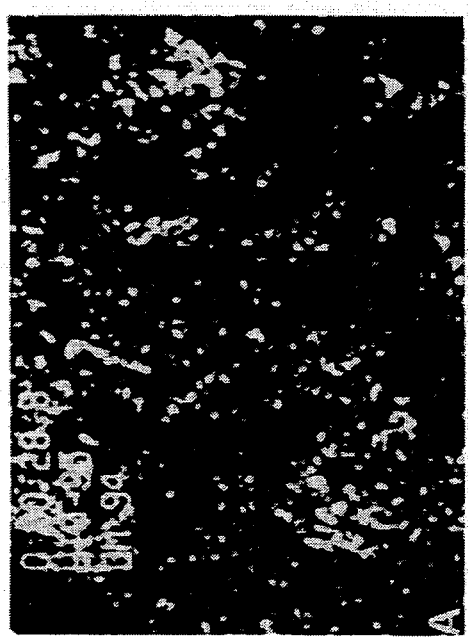
Figure 1D:

It has been found that uniform blends of two liquid crystalline polymers can be made by mixing, as for example by stirring, a preformed thermotropic liquid crystalline polymer with the reactants necessary for forming a second liquid crystalline polymer at a temperature at which the preformed thermotropic liquid crystalline polymer is in the melt phase and the reactants combine to form the second liquid crystalline polymer. Optionally, the preformed thermotropic liquid crystalline polymer can be a blend of more than one liquid crystalline polymer. One component of that blend may optionally be the second liquid crystalline polymer, more of which is then made when the reactants polymerize. The method is particularly useful when the second liquid crystalline polymer is an aromatic polyester and the reactants are aromatic molecules, each having two reactive substituents which are alike or different and which can react to form aromatic polyester linkages. Examples of these reactive substituents are —OH; —OCOR, where R is an alkyl group having one to about six carbons; —COOH; COOAr, where Ar is an aromatic moiety having 6 to 14 carbon atoms; and mixtures thereof. The aromatic polyester-forming reactants may optionally be substituted with non-reactive substituents, such as lower alkyl groups and halogen atoms.

The preferred process by which the second liquid crystalline polyester forms is melt acidolysis polymerization, wherein the aromatic phenolic groups have been converted to lower aliphatic acid esters; these phenolic ester groups react with aromatic acid groups during polymerization to yield aromatic polyester linkages and by-product lower aliphatic acid, such as acetic acid, propionic acid, or n- or isobutyric acid. Preferably, the phenolic groups in the reactants have been converted to acetates, with by-product acetic acid forming during the polymerization. Optionally, the melt acidolysis polymerization can be carried out using the free phenols in the presence of sufficient acetic anhydride to esterify the hydroxyl groups to acetates.

The polymerization reaction is carried out in a temperature range in which the preformed thermotropic liquid crystalline polymer is in an anisotropic melt phase, typically at about 200° C. to about 400° C. The preformed thermotropic liquid crystalline polymer is provided in an amount such that it comprises about 0.5 to about 70% by weight of the in situ liquid crystalline blend, preferably about 2% to about 50% of the blend, and most preferably about 3% to about 10% of the blend. Any preformed thermotropic liquid crystalline polymer can be used, such as an aromatic polyester, aliphatic-aromatic polyester, poly(ester-amide), poly(ester-carbonate) or a mixture thereof. Aromatic polyesters are preferred, such as those that include one or more repeat units derived from 2-hydroxy-6-naphthoic acid, 2,6-dihydroxynaphthalene, 2,6-naphthalenedicarboxylic acid, 4-hydroxybenzoic acid, 1,4-hydroquinone, terephthalic acid, isophthalic acid and mixtures thereof. Poly[co(4-oxybenzoate/6-oxy-2-naphthoate)], the copolyester of 2-hydroxy-6-naphthoic acid and 4-hydroxybenzoic acid, is a preferred preformed thermotropic liquid crystalline polyester, other liquid crystalline polyesters which are preferred for use as preformed polymers for making in situ blends include the polymer comprising 6-oxy-2-naphthoyl, terephthaloyl and 1,4-dioxyphenylene molecular repeat units; the polymer comprising 6-oxy-2-naphthoyl, 4-oxybenzoyl, 4,4′-dioxybiphenylene and terephthaloyl molecular repeat units; and the copolymer comprising 4-oxybenzoyl, terephthaloyl and 1,4-dioxy-2-phenylphenylene molecular repeat units. Poly(ester-amides), as for example the copolymer comprising 6-oxy-2-naphthoyl, terephthaloyl and p-aminophenoxy molecular repeat units, also perform well as preformed liquid crystalline polymers for making in situ blends.

It has been found that the in situ blends are particularly advantageous when the second liquid crystalline polymer is biphasic, wherein the biphasic melt has both a liquid crystalline anisotropic phase and an isotropic non-liquid crystalline phase. When a biphasic liquid crystalline polymer is produced in situ from its monomers in the melt of a preformed thermotropic liquid crystalline polymer which has essentially one phase, the resulting blend has improved morphology, both as a solid and as a melt, and also has improved melt processability. Biphasic polymers are typically copolymers in which one of the polymers making up the copolymer is highly crystalline. Liquid crystalline copolymers of aromatic hydroxyacids (e.g. 4-hydroxybenzoic acid) copolymerized with the following groups of monomers are often biphasic: isophthalic acid and 1,4-hydroquinone; resorcinol and terephthalic acid; aliphatic diacids and 1,4-hydroquinone; terephthalic acid and aliphatic diols; terephthalic acid and 4,4'-biphenol; and isophthalic acid, terephthalic acid and 1,4-hydroquinone.

A preferred in situ blend is the blend comprising a small amount of a thermotropic liquid crystalline polymer, such as poly[co(4-oxybenzoate/6-oxy-2-naphthoate)], and poly[co(4-oxybenzoate/1,4-phenylene isophthalate )] as the second liquid crystalline polymer, formed in situ from 4-hydroxybenzoic acid, 1,4-hydroquinone, and isophthalic acid or from derivatives of these (e.g. 4-acetoxybenzoic acid and 1,4-hydroquinone diacetate). Poly[co(4-oxybenzoate/1,4-phenyleneisophthalate)] is biphasic, but the in situ blends with such liquid crystalline polymers as poly[-co(4-oxybenzoate/6-oxy-2-naphthoate)] are mostly anisotropic. These blends are described in detail later.

The present invention is also particularly useful for making blends of a preformed thermotropic liquid crystalline polymer which is readily processed in the melt with a second liquid crystalline polymer which is not melt processable, is difficult to process, or cannot readily be made by melt polymerization. An example of this embodiment is provided in Example 60, wherein the copolymer of 4,4'-biphenol, terephthalic acid and 4-hydroxybenzoic acid is synthesized from the phenolic esters by melt acidolysis polymerization in a melt of poly[co(4-oxybenzoate/6-oxy-2-naphthoate)]. The copolymer of 4,4'-biphenol, terephthalic acid and 4-hydroxybenzoic acid, when made in the absence of the preformed thermotropic liquid crystalline polymer, is typically so high melting (about 380° C.) that it is not readily synthesized or processed in the melt. The polymer may also be biphasic. On the other hand, the in situ blend with the preformed thermotropic liquid crystalline polymer is readily synthesized and processed in the melt phase.

It is also noteworthy that a copolymer comprising all four comonomers of the blend described immediately above (i.e., 4,4'-biphenol, terephthalic acid, 4-hydroxybenzoic acid and 2-hydroxy-6-naphthoic acid) was synthesized and found to have different properties than the in situ blend (especially melt viscosity; see Example 61 and Table XXIII). This indicates that the product made by this method is a blend and not a random copolymer which results from transesterification of the monomers and preformed polymer. Thus, if transesterification has occurred, it has done so to a limited extent.

In situ blends of poly[co(4-oxybenzoate/1,4-phenyleneisophthalate)] with preformed thermotropic liquid crystalline polymers are described and exemplified in detail below. Specific embodiments involving the synthesis of other liquid crystalline polymers as components of in situ blends are set forth in some of the later examples. Illustrative polymers that are made by the in situ method include polymers comprising the following sets of monomer units: 4-oxybenzoyl, 1,4-dioxyphenylene, isophthaloyl, 4,4'-dioxybiphenylene; 4-oxybenzoyl, 1,4-dioxyphenylene, isophthaloyl, terephthaloyl; and 4-oxybenzoyl, terephthaloyl, 4,4'-dioxybiphenylene.

Appropriate monomers capable of forming poly[-co(4-oxybenzoate/phenyleneisophthalate)] via a melt acidolysis reaction are provided in a stirred heated reaction zone together with a suitable amount of the molten preformed polymer which is capable of forming an anisotropic single phase melt as described hereafter.

Typical reactants used to form the poly[co(4-oxybenzoate/phenyleneisophthalate)] are p-hydroxybenzoic acid, hydroquinone and isophthalic acid. Other ester- and amide-forming comonomers (e.g., terephthalic acid, chloroterephthalic acid, chloroisophthalic acid, phenylterephthalic acid, phenylisophthalic acid, 2,6-naphthalene dicarboxylic acid, 4,4'-biphenyl dicarboxylic acid, 4,4'-diphenyl ether dicarboxylic acid, 4,4'-diphenyl sulfone dicarboxylic acid, 4,4'-biphenol, 4,4'-dihydroxy diphenyl ether, 4,4'-dihydroxy diphenyl sulfone, resorcinol, meta and/or para-hydroxy analine, 4-hydroxy-4'-carboxydiphenyl ether, 2,6-dihydroxynaphthalene, etc., and mixtures of the foregoing) may be incorporated in the poly[co(4-oxybenzoate/-phenyleneisophthalate)] in a minor concentration of up to 10 mole percent so long as they do not significantly interfere with the achievement of the desired product characteristics. The aromatic rings of the monomers optionally may include substitution of at least some of the hydrogen atoms present upon an aromatic ring selected from the group consisting of an alkyl group of 1 to 4 carbon atoms, an alkoxy group of 1 to 4 carbon atoms, halogen (e.g., fluorine, chlorine and bromine), phenyl (including substituted phenyl), and mixtures thereof.

In order for the reactants to undergo the melt-acidolysis reaction it is essential that the reactive hydroxyl groups present thereon first be modified. For instance, the p-hydroxybenzoic acid and hydroquinone reactants may be initially provided in a modified form whereby the usual hydroxyl groups of the monomers are esterified (i.e., they are provided as lower acyl esters). Such lower acyl groups commonly have from about two to about four carbon atoms. Most preferably, the acetate esters of the organic monomer reactants are provided. Accordingly, particularly preferred reactants are p-acetoxybenzoic acid, isophthalic acid, and hydroquinone diacetate. The acetylation can be carried out in a separate vessel outside the reactor, or such acetylation preliminarily may be carried out in the same reactor through the addition of acetic anhydride prior to the commencement of the polymerization. Conventional esterification catalysts, such as potassium acetate, may be utilized.

In accordance with preferred embodiments the monomers are provided in the reaction zone in concentrations which yield a poly[co(4-oxybenzoate/-phenyleneisophthalate) which contains approximately 25 to 50 (e.g., approximately 30 to 40) mole percent of recurring 4-oxybenzoate units. As will be apparent to those skilled in the art, the end groups of the resulting poly[co(4-oxybenzoate/phenyleneisophthalate) will be influenced by the specific reaction conditions which are selected.

The preformed polymer which is capable of forming an anisotropic single phase melt is provided in the reaction zone in a well-dispersed form in a concentration of approximately 0.5 to 15 (e.g., 1 to 8, and most preferably 3 to 6) percent by weight with its concentration being based upon the total concentration of monomers initially present in the reaction zone. Such preformed polymer preferably exhibits the single phase anisotropic melt at a temperature within the range of 280° to 340° C. It also preferably is capable of undergoing melt processing at a temperature as high as 340° C. in the absence of significant polymer degradation. The anisotropic character of the polymer melt may be confirmed by conventional polarized light techniques whereby crossed-polarizers are utilized. More specifically, the anisotropic or ordered nature of the melt phase may conveniently be confirmed by the use of a Leitz polarizing microscope at a magnification of 400 to 750× with the sample on a Leitz hot stage and under a nitrogen atmosphere. The amount of light transmitted changes when the sample is forced to flow; however, the sample is optically anisotropic even in the static state. On the contrary, typical melt-processable polymers do not transmit light in the melt to any substantial degree when examined under quiescent conditions and are isotropic in nature. The single phase nature of the melt may be confirmed by thermal optical microscopy, x-ray crystallography, electron microscopy, polarized light microscopy, differential scanning calorimetry, melt rheology, and other known techniques.

Representative classes of polymers from which the preformed polymer may be selected include anisotropic melt-forming wholly aromatic polyesters, anisotropic melt-forming aliphatic-aromatic polyesters, anisotropic melt-forming poly(ester-amides), anisotropic melt-forming poly(ester-carbonates), and mixtures of these. In a preferred embodiment the preformed polymer which is capable of forming an anisotropic single phase melt is a wholly aromatic polyester. Also, in a preferred embodiment the preformed polymer comprises not less than about 10 mole percent of recurring units which include a naphthalene moiety (e.g., a 6-oxy-2-naphthoyl moiety, 2,6-dioxynaphthalene moiety, and a 2,6-dicarboxynaphthalene moiety). The preformed polymer which is utilized preferably exhibits an inherent viscosity of at least 2.0 dl./g. (e.g., 2.0 to 10.0 dl./g/) when dissolved in a concentration of 0.1 percent by weight in equal parts by volume of pentafluorophenol and hexafluoroisopropanol at 25° C. The preformed polymers which are capable of forming an anisotropic single phase melt may be selected by those skilled in polymer technology from those known in the art. Preferred polymers which may serve in this role are disclosed in U.S. Pat. Nos. 4,161,470; 4,184,996; 4,256,624; 4,330,457; 4,371,660; and 4,473,682, which are herein incorporated by reference.

The preformed polymer which is capable of forming an anisotropic single phase melt is poly[co(4-oxybenzoate/6-oxynaphthoate)]. This wholly aromatic polyester is the subject matter of U.S. Pat. No. 4,161,470, and consists essentially of moieties I and II which may optionally include substitution of at least some of the hydrogen atoms present upon an aromatic ring selected from the group consisting of an alkyl group of 1 to 4 carbon atoms, an alkoxy group of 1 to 4 carbon atoms, halogen (e.g., fluorine, chlorine and bromine), phenyl (including substituted phenyl), and mixtures thereof wherein:

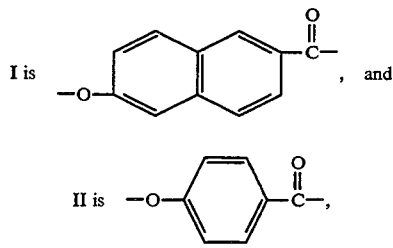

and comprises approximately 10 to 90 mole percent of moiety I and approximately 10 to 90 mole percent of moiety II. In a preferred embodiment the aromatic rings are substantially free of ring substitution. Also, in a preferred embodiment the poly[co(4-oxybenzoate/6-oxynaphthoate)] comprises approximately 20 to 40 mole percent of moiety I and approximately 60 to 80 mole percent of moiety II. In a particularly preferred embodiment the Poly[co(4-oxybenzoate/6-oxynaphthoate)] consists essentially of approximately 27 mole percent of recurring 6-oxy-2-naphthoyl moieties and approximately 73 mole percent of recurring 4-oxybenzoyl moieties. In another particularly preferred embodiment such polymer consists essentially of approximately 20 mole percent of recurring 6-oxy-2-naphthoyl moieties and approximately 80 mole percent of recurring 4-oxybenzoyl moieties.

In preferred embodiments the poly[co(4-oxybenzoate/6-oxynaphthoate)] is capable of forming an anisotropic single phase melt at a temperature below approximately 340° C., and most preferably at a temperature below approximately 325° C. It also is particularly preferred that such preformed polymer exhibit an inherent viscosity of at least 4.0 dl./g. (e.g., approximately 5.0 to 7.5 dl./g.) when dissolved in a concentration of 0.1 percent by weight in equal parts by volume of pentafluorophenol and hexafluoroisopropanol at 25° C.

In a preferred embodiment the preformed polymer is formed in the presence of an approximately 0.25 to 4 percent molar excess of an aromatic dicarboxylic acid monomer and/or an esterified derivative thereof in accordance with the teachings of U.S. Pat. No. 4,539,386 which is herein incorporated by reference. The preferred aromatic dicarboxylic acid is terephthalic acid and the resulting polymer is substantially incapable of further chain growth upon heating.

In a preferred embodiment preformed polymer which is capable of forming an anisotropic single phase melt is preblended and intimately admixed with a quantity of preformed poly[co(4-oxybenzoate/phenyleneisophthalate)] at the time it is introduced into the stirred heated reaction zone. Such preblending may be accomplished by physical blending of the molten polymers or by preparing the poly[co(4-oxybenzoate/phenyleneisophthalate)] in the presence of the preformed polymer which is capable of forming an anisotropic single phase melt. Particularly good results have been achieved when the preformed polymer which is capable of forming an anisotropic single phase melt is preblended with a substantially equal amount by weight of preformed poly[co(4-oxybenzoate/phenyleneisophthalate)] at the time it is introduced into the stirred heated reaction zone.

During the course of the melt-acidolysis polymerization in the stirred heated reaction zone it is preferred that a maximum temperature of no more than approximately 350° C. be achieved, and most preferably a maximum temperature of no more than approximately 340° C. This assures that the resulting poly[co(4-oxybenzoate/phenyleneisophthalate)] will not be subjected to any significant degree of polymer degradation.

The process of the present invention has been found to be capable of forming poly[co(4-oxybenzoate/phenyleneisophthalate)] on a more reliable, more reproducible, and a more stable basis than the prior art. Processing difficulties normally associated with the biphasic nature of such polymer are substantially eliminated. The resulting product advantageously is found to exhibit anisotropic melt properties over a broader temperature range than when poly[co(4-oxybenzoate/- phenyleneisophthalate)] is formed in accordance with the prior art. Also, the resulting novel composition of matter is capable of reliably undergoing melt processing to form quality three-dimensional articles.

The product of the present invention may optionally incorporate approximately 1 to 50 percent by weight (preferably approximately 10 to 30 percent by weight), based upon the total weight of the polymers, of a solid filler and/or reinforcing agent. Representative filler materials include calcium silicate, silica, clays, talc, mica, polytetrafluoroethylene, graphite, alumina trihydrate, sodium aluminum carbonate, barium ferrite, wollastonite, etc. Representative reinforcing fibers include glass fibers, graphitic carbon fibers, amorphous carbon fibers, synthetic polymeric fibers, alumina fibers, aluminum silicate fibers, aluminum oxide fibers, titanium fibers, magnesium fibers, rock wool fibers, steel fibers, tungsten fibers, wollastonite fibers having an aspect ratio greater than 3 to 1, cotton, wood, cellulose fibers, etc.

In preferred embodiments quality three-dimensional articles are formed upon melt processing which exhibit a heat deflection temperature at 264 psi of at least 200° C. (most preferably at least 220° C.), and a Notched Izod impact strength of at least 1.0 ft.-lb./in. (most preferably at least 1.5 ft.-lb./in)

The following Examples are presented as specific illustrations of the claimed invention. It should be understood, however, that the invention is not limited to the specific details set forth in the Examples.

EXAMPLE 1

A cylindrical two liter round-bottomed glass reactor was provided which was equipped with a nitrogen inlet, a thermocouple, Vigreux column attached to a condenser and receiver, and a C-shaped 316 stainless steel mechanical stirrer. The reactor was immersed in a sand bath and provided with means to accurately control the temperature. Into the reactor were placed 290.1 grams (2.1 moles) of p-hydroxybenzoic acid, 218.0 grams (1.98 moles including 0.5 percent molar excess) of hydroquinone, and 324.0 grams (1.95 moles) of isophthalic acid which upon polymerization were capable of forming poly[co(4-oxybenzoate/phenyleneisophthalate)]. 24.1 grams of preformed poly[co(4-oxybenzoate/6-oxynaphthoate)] while in solid particulate form were added to the reactor. Such preformed wholly aromatic polyester was formed in accordance with the teachings of U.S. Pat. No. 4,161,470 and was capable of forming an anisotropic single phase melt. The preformed polymer contained 73 mole percent of recurring 4-oxybenzoate units and 27 mole percent of recurring 6-oxynaphthoate units and exhibited an inherent viscosity of 7.0 dl./g. when dissolved in a concentration of 0.1 percent by weight in equal parts by volume of pentafluorophenol and hexafluoroisopropanol at 25° C. Such preformed polymer was present in the reactor in a concentration of 2.9 percent by weight based upon the total concentration of the three monomers which initially were present in the reaction zone. Additionally, 0.63 grams (75.5 parts per million) of potassium acetate catalyst were added to the reactor. The reactor was under a constant purge of nitrogen at a rate of approximately 30 to 40 c.c./minute while being charged. The reactor was next evacuated to approximately 1 to 2 mbar two times with the reduced pressure being broken with nitrogen each time.

Acetic anhydride next was introduced into the reactor through an addition funnel in a quantity of 637.4 grams (6.15 moles including a 2.5 mole percent excess). Such acetic anhydride was of 98.5 mole percent purity and was added for the purpose of converting the p-hydroxybenzoic acid to 4-acetoxybenzoic acid and the hydroquinone to hydroquinone diacetate prior to the onset of polymerization.

Through the use of a MicRIcon® controller the contents of the reactor while stirred were heated in stages as indicated while under a purge of nitrogen at a rate of 30 to 40 c.c./minute.

| Heating Stage No. | Temperature in °C. | Time at Temperature (minutes) |
| --- | --- | --- |
| 1 | 25 | 1 |
| 2 | 125 | 60 |
| 3 | 150 | 50 |
| 4 | 200 | 50 |
| 5 | 250 | 50 |
| 6 | 300 | 100 |
| 7 | 325 | 50 |
| 8 | 325 | 15 |
| 9 | 325 | 60 |

The acetic acid began distilling-off when the reactor was at 150° C. and at the end of heating stage No. 8 approximately 98 percent of the theoretical amount (687 ml.) had evolved.

At the conclusion of heating stage No. 9 the torque on the stirrer started to rise and an increase in torque of 50 mvolts from the initial value was observed. The reactor was cooled and was opened to obtain the resulting poly[co(4-oxybenzoate/phenyleneisophthalate)] in which the preformed poly[co(4-oxybenzoate/6-oxynaphthoate)] was intimately admixed. The polymer admixture was cut and ground into chips to yield 713.2 grams of product (95.8 percent of theoretical).

The resulting product was found to exhibit an inherent viscosity of 0.81 dl./g. when dissolved in a concentration of 0.1 percent by weight in equal parts by volume of pentafluorophenol and hexafluoroisopropanol at 25° C. The product also was found to exhibit the following properties as determined by standard differential scanning calorimetry at 20° C./min. heating rate:

Melting Point (Tm)=306° C.,
Heat of Melting (Hm)=6.2 joules/gram,
Glass Transition Temperature (Tg)=128° C.,
Crystallization Point (Tc)=263° C., and
Heat of Crystallization (Hc)=-8.9 joules/gram.

The melt viscosity of the product at 330° C. was 344 poise at a shear rate of 100 sec $^{-1}$ and 112 poise at a shear rate of 1000 sec. $^{-1}$. The product when melted exhibited a homogeneous fine uniform microstructure by thermal-optical microscopy and this texture was retained after quenching at ambient temperature.

While at a temperature of 350° C. the molten product was extruded through a single hole spinneret (0.005 in. diameter×0.007 in. at a throughput rate of 0.4 gram/minute). The resulting as-spun filament was quenched in ambient air (25° C. and 65 percent relative humidity) prior to windup at a speed of 705 meters/minute. When a section of the as-spun fiber was examined by optical and thermo-optical microscopy it was found to have an excellent fine uniform microstructure.

EXAMPLES 2 to 16

Example 1 was substantially repeated with the exceptions indicated. More specifically, the molar ratios of the three monomers required to form the poly[co(4-oxybenzoate/phenyleneisophthalate)] were varied except in Example 2, and in some instances the polymerization heating schedule was varied. In Examples 5 to 8 Heating Stage Nos. 7 through 9 were carried out at 340° C. instead of 325° C. In Examples 9 to 16 Heating Stage Nos. 7 through 9 were carried out at a temperature of 330° C. instead of 325° C. The molar ratios of the monomers and the concentration of the preformed polymer which is capable of forming an anisotropic single phase melt are reported in Table I where Monomer A is p-hydroxybenzoic acid, Monomer B is hydroquinone, and Monomer C is isophthalic acid. The preformed Poly[co(4-oxybenzoate/6-oxynaphthoate)] is designated the "Preformed Polymer" and the concentration is expressed in weight percent based upon the total concentration of monomers initially present in the reactor. Properties of the resulting product also are reported in Table I. With respect to Examples 3 through 8 the melt viscosity measurements were made at 325° C. instead of 330° C. With respect to Example 15 the melt viscosity measurements were made at 340° C. instead of 330° C. With respect to Example 16 the melt viscosity measurements were made at 350° C. instead of 330° C.

It was found that the products of Examples 2 to 16 could be melt extruded as described in Example 1 to form single filaments having an excellent fine uniform microstructure when examined by optical and thermo-optical microscopy.

The remaining portions of the product from the various Examples were combined (e.g., Examples 1 and 2, 3 and 4, etc.) and were compounded while molten with 30 percent by weight of chopped glass reinforcing fibers based upon the total weight of the fibers to form molding compounds. These molding compounds were injection molded to form standard test specimens while using a barrel temperature range of 295° to 320° C. and a mold temperature of 100° C. Tensile tests were performed in accordance with ASTM D638, flexural tests were performed in accordance with ASTM D790, Notched Izod impact tests were performed in accordance with ASTM D256, and heat-deflection testing was performed in accordance with ASTM D648. The properties of the resulting test specimens are reported in Table II.

For comparative purposes, Example 2 was repeated two times in the absence of the preformed poly[co(4-oxybenzoate/6-oxynaphthoate)]. The identical runs were designated "Comparative X" and "Comparative Y". The properties of the resulting products are not readily reproducible and are reported in Table I. Also, properties of standard test bars formed while using barrel temperatures of 295° C. and 310° C. are reported in Table II. It will be noted that each of the comparative runs formed products having a relatively low inherent viscosity of 0.5 dl./g. Also, the glass fiber-reinforced comparative products following combination and molding exhibited substantially higher melt viscosities when compared to the values for Example 2.

TABLE I

| Example No. | Monomer A | Monomer B | Monomer C | Preformed Polymer | Tm °C. | Hm J./g. | Tg °C. | Tc °C. | Hc J./g. | Melt Viscosity 100 sec.$^{-1}$ | Melt Viscosity 1000 sec.$^{-1}$ | Inherent Viscosity dl./g. |
|---|---|---|---|---|---|---|---|---|---|---|---|---|
| 2 | 35 | 32.5 | 32.5 | 2.9 | 307 | 5.6 | 128 | 263 | −8.9 | 426 | 146 | 0.89 |
| 3 | 35 | 32.5 | 32.5 | 4.8 | 309 | 4.7 | 128 | 266 | −7.1 | 429 | 127 | 1.00 |
| 4 | 35 | 32.5 | 32.5 | 4.8 | 310 | 5.1 | 129 | 267 | −6.8 | 384 | 120 | 0.96 |
| 5 | 35 | 32.5 | 32.5 | 4.8 | 303 | 7.7 | 129 | 262 | −7.6 | 554 | 178 | 1.22 |
| 6 | 35 | 32.5 | 32.5 | 4.8 | 302 | 9.2 | 128 | 254 | −7.8 | 601 | 191 | 1.18 |
| 7 | 35 | 32.5 | 32.5 | 9.6 | 309 | 5.9 | 131 | 259 | −6.8 | 546 | 179 | 1.70 |
| 8 | 35 | 32.5 | 32.5 | 9.6 | 304 | 6.1 | 131 | 258 | −6.0 | 591 | 198 | 1.73 |
| 9 | 35 | 32.5 | 32.5 | 14.5 | 309 | 6.2 | 130 | 261 | −5.5 | 477 | 158 | 2.20 |
| 10 | 35 | 32.5 | 32.5 | 14.5 | 297 | 5.6 | 127 | 242 | −4.0 | 984 | 337 | 2.37 |
| 11 | 33 | 33.5 | 33.5 | 5.1 | 303 | 9.8 | 134 | 266 | −7.9 | 695 | 241 | 1.26 |
| 12 | 33 | 33.5 | 33.5 | 5.1 | 305 | 9.8 | 133 | 267 | −8.0 | 821 | 274 | 1.34 |
| 13 | 32 | 34 | 34 | 7.7 | 311 | 8.3 | 134 | 266 | −7.6 | 892 | 298 | 1.36 |
| 14 | 32 | 34 | 34 | 7.7 | 303 | 6.8 | 132 | 258 | −8.0 | 909 | 312 | 1.34 |
| 15 | 30 | 35 | 35 | 4.8 | 295 | 16.0 | 132 | 259 | −9.2 | 2286 | 733 | 0.91 |
| 16 | 30 | 35 | 35 | 4.8 | 296 | 16.8 | 132 | 258 | −9.8 | 2771 | 873 | 0.99 |
| Comparative X | 35 | 32.5 | 32.5 | 0 | 296 309 | 7.5 | 134 | 250 | −7.1 | 525 | 201 | 0.5 |
| Comparative Y | 35 | 32.5 | 32.5 | 0 | 289 302 | 9.3 | 131 | 244 | −8.2 | 452 | 174 | 0.5 |

TABLE II

| Example Nos. | Tensile Strength × 1,000 psi | Tensile Modulus × 1,000,000 psi | Elongation Percent | Flexural Strength × 1,000 psi | Flexural Modulus × 1,000,000 psi | Notched Izod Impact Strength ft.-lb./in. | Heat Deflection Temperature in °C. @ 264 psi. |
|---|---|---|---|---|---|---|---|
| 1 + 2 | 13.46 | 1.84 | 0.8 | n.m. | n.m. | 1.37 | 223 |
| 3 + 4 | 17.31 | 1.97 | 1.05 | 23.74 | 1.90 | 1.27 | 214 |
| 5 + 6 | 15.82 | 1.99 | 0.92 | 21.11 | 1.87 | 1.17 | 216 |
| 7 + 8 | 17.13 | 1.93 | 1.05 | 22.72 | 1.83 | 1.24 | 204 |
| 9 + 10 | 17.11 | 2.00 | 1.02 | n.m. | n.m. | 1.02 | 218 |
| 11 + 12 | 19.10 | 2.01 | 1.16 | 23.8 | 1.82 | 1.00 | 226 |
| 13 + 14 | n.m. | n.m. | n.m. | n.m. | n.m. | 0.94 | 218 |
| 15 + 16 | n.m. | n.m. | n.m. | n.m. | n.m. | 0.94 | 222 |
| Comparative X & Y Molded at 295° C. | 15.1 | 1.90 | 1.00 | 21.20 | 2.00 | 1.00 | 232 |
| Comparative X & Y Molded at | 17.0 | 2.00 | 1.00 | 22.90 | 2.00 | 1.50 | 215 |

TABLE II-continued

| Example Nos. | Tensile Strength × 1,000 psi | Tensile Modulus × 1,000,000 psi | Elongation Percent | Flexural Strength × 1,000 psi | Flexural Modulus × 1,000,000 psi | Notched Izod Impact Strength ft.-lb./in. | Heat Deflection Temperature in °C. @ 264 psi. |
| --- | --- | --- | --- | --- | --- | --- | --- |
| 310° C. | | | | | | | | n.m. = not measured

EXAMPLES 17 to 22

Example 1 was substantially repeated with the exceptions indicated. More specifically, the preformed polymer contained 77 mole percent of recurring 4-oxybenzoate units and 23 mole percent of recurring 6-oxynaphthoate units and exhibited an inherent viscosity of 6.8 dl./g. when dissolved in a concentration of 0.1 percent by weight in equal parts by volume of pentafluorophenol and hexafluoroisopropanol, in Examples 21 and 22 the molar ratios of the three monomers required to form the poly[co(4-oxybenzoate/phenyleneisophthalate)] were varied, and Heating Stage Nos. 7 to 9 were carried out at 330° C. instead of 325° C. The molar ratios of the monomers and the concentration of the preformed polymer which is capable of forming an anisotropic single phase melt are reported in Table III where Monomer A is p-hydroxybenzoic acid, Monomer B is hydroquinone, and Monomer C is isophthalic acid. The preformed poly[co(4-oxybenzoate/6-oxynaphthoate)] is designated the "Preformed Polymer" and its concentration is expressed in weight percent based upon the total concentration of monomers initially present in the reactor. Properties of the resulting product also are reported in Table III. Glass fiber-reinforced test specimens were injection molded as described with respect to Examples 2 to 16. The properties of the resulting test specimens are reported in Table IV.

When the resulting products in the absence of the reinforcing fibers were melt extruded to form fibers, the resulting fibers were found via thermo-optical microscopic studies to exhibit an excellent fine uniform microstructure resembling that of the preformed polymer.

EXAMPLES 23 to 26

Example 1 was substantially repeated with the exceptions indicated. More specifically, the preformed polymer contained 80 mole percent of recurring 4-oxybenzoate units and 20 mole percent of recurring 6-oxynaphthoate units and Heating Stage Nos. 7 to 9 were carried out at 330° C. instead of 325° C. The preformed polymer was not sufficiently soluble to carry out the standard inherent viscosity determination. The concentrations of the preformed polymer which is capable of forming an anisotropic single phase melt are reported in Table V where Monomer A is p-hydroxybenzoic acid, Monomer B is hydroquinone, and Monomer C is isophthalic acid. The preformed poly[co(4-oxybenzoate/6-oxynaphthoate)] is designated the "Preformed Polymer" and its concentration is expressed in weight percent based upon the total concentration of monomers initially present in the reactor. Properties of the resulting product also are reported in Table V. Glass fiber-reinforced test specimens were injection molded as described with respect to Examples 2 to 16. When the glass fiber reinforced products of Examples 23 and 24 were combined, a Notched Izod impact strength of 1.27 ft.-lb./in., and a heat defection temperature of 217° C. were observed. When the glass fiber reinforced products of Examples 25 and 26 were combined, a Notched Izod impact strength of 0.92 ft.-lb./in., and heat defection temperature of 217° C. were observed.

When the resulting products in the absence of the reinforcing fibers were melt extruded to form fibers, the resulting fibers were found via thermo-optical microscopic studies to exhibit an excellent fine uniform microstructure resembling that of the preformed polymer.

TABLE III

| Example No. | Monomer A | Monomer B | Monomer C | Preformed Polymer | Tm °C. | Hm J./g. | Tg °C. | Tc °C. | Hc J./g. | Melt Viscosity 100 sec.$^{-1}$ | Melt Viscosity 1000 sec.$^{-1}$ | Inherent Viscosity dl./g. |
| --- | --- | --- | --- | --- | --- | --- | --- | --- | --- | --- | --- | --- |
| 17 | 35 | 32.5 | 32.5 | 2.9 | 302 | 6.8 | 133 | 255 | −6.5 | 686 | 233 | 1.2 |
| 18 | 35 | 32.5 | 32.5 | 2.9 | 304 | 8.1 | 132 | 257 | −6.7 | 648 | 221 | 1.22 |
| 19 | 35 | 32.5 | 32.5 | 5.0 | 309 | 7.3 | 133 | 262 | −6.3 | 668 | 242 | 1.28 |
| 20 | 35 | 32.5 | 32.5 | 5.0 | 300 | 5.8 | 133 | 253 | −6.5 | 625 | 230 | 1.36 |
| 21 | 40 | 30 | 30 | 2.9 | 310 | 9.1 | 127 | 249 288 | −2.4 −1.6 | 457 | 157 | 1.51 |
| 22 | 40 | 30 | 30 | 2.9 | 307 | 8.5 | 126 | 246 287 | −2.4 −1.2 | 368 | 128 | 1.25 |

TABLE IV

| Example Nos. | Tensile Strength × 1,000 psi | Tensile Modulus × 1,000,000 psi | Elongation Percent | Flexural Strength × 1,000 psi | Flexural Modulus × 1,000,000 psi | Notched Izod Impact Strength ft.-lb./in. | Heat Deflection Temperature in °C. @ 264 psi. |
| --- | --- | --- | --- | --- | --- | --- | --- |
| 17 + 18 | 17.26 | 1.91 | 1.1 | 22.93 | 1.8 | 1.3 | 236 |
| 19 + 20 | n.m | n.m | n.m | n.m | n.m | 1.21 | 223 |
| 21 + 22 | 18.6 | 2.18 | 1.06 | 23.83 | 1.97 | 1.14 | 231 | n.m. = not measured

TABLE V

| Example No. | Monomer A | Monomer B | Monomer C | Preformed Polymer | Tm °C. | Hm J./g. | Tg °C. | Tc °C. | Hc J./g. | Melt Viscosity 100 sec.$^{-1}$ | Melt Viscosity 1000 sec.$^{-1}$ | Inherent Viscosity dl./g. |
|---|---|---|---|---|---|---|---|---|---|---|---|---|
| 23 | 35 | 32.5 | 32.5 | 5.3 | 307 | 8.5 | 133 | 264 | −7.4 | 531 | 198 | 0.89 |
| 24 | 35 | 32.5 | 32.5 | 5.3 | 309 | 5.8 | 132 | 263 | −6.9 | 460 | 173 | 0.85 |
| 25 | 35 | 32.5 | 32.5 | 9.4 | 308 | 8.0 | 129 | 260 | −6.6 | 505 | 167 | n.s. |
| 26 | 35 | 32.5 | 32.5 | 9.4 | 310 | 8.9 | 132 | 267 | −6.6 | 710 | 223 | n.s. | n.s. = not soluble in equal parts of pentafluorophenol and hexafluoroisopropanol.

EXAMPLES 27 to 34

The preceding examples were repeated in a modified form to demonstrate particularly preferred embodiments of the present invention. In each instance the preformed poly[co(4-oxybenzoate/6-oxynaphthoate)] was intimately admixed with preformed poly[co(4-oxybenzoate/phenyleneisophthalate)] at the time of its introduction into the reactor. Such intimate admixture was prepared by preliminarily forming the poly[co(4-oxybenzoate/phenyleneisophthalate)] in the presence of the preformed poly[co(4-oxybenzoate/6-oxynaphthoate)] in a manner similar to that previously described to form a uniform masterbatch or master blend of the two polymers. In each instance the masterbatch which was provided in the reactor consisted of equal parts by weight of preformed poly[co(4-oxybenzoate/6-oxynaphthoate)] and poly[co(4-oxybenzoate/-phenyleneisophthalate)]. In all instances the preformed poly[co(4-oxybenzoate/phenyleneisophthalate)] was formed of monomers which were supplied in the same relative molar concentrations as described in Example 1. In Examples 27 to 30 the poly[co(4-oxybenzoate/6-oxynaphthoate)] contained 73 mole percent of recurring 4-oxybenzoate units and 27 mole percent of recurring 6-oxynaphthoate units. In Examples 31 and 32, the poly[co(4-oxybenzoate/6-oxynaphthoate)] contained 77 mole percent of recurring 4-oxybenzoate units and 23 mole percent of recurring 6-oxynaphthoate units. In Examples 33 and 34, the poly[co(4-oxybenzoate/6-oxynaphthoate)] contained 80 mole percent of recurring 4-oxybenzoate units and 20 mole percent of recurring 6-oxynaphthoate units. Heating Stage Nos. 7 to 9 were carried out at 330° C. for Examples 27 to 32, and at 340° C. for Examples 33 to 34.

Figure 5B:
Figure 5D:
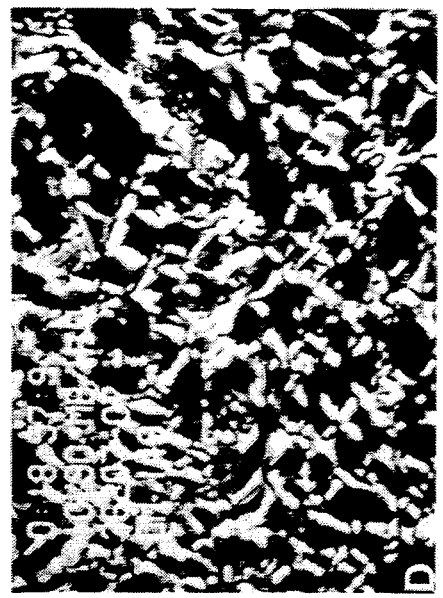
Figure 5A:
Figure 5C:

The resulting products were found via thermo-optical microscopic studies to exhibit an excellent uniform microstructure which was of an even finer nature than that achieved in the preceding examples wherein the preformed polymer when introduced into the reactor was not in the form of a master blend. The product of Examples 27 to 30 is illustrated in FIGS. 5A, 5B, 5C, and 5D.

In Table VI are reported the concentrations of the masterbatches which were introduced into the reactor expressed in weight percent based upon the total concentration of the monomers which initially are present in the reactor. Table VI also reports properties of the resulting products. Glass fiber-reinforced test specimens of the resulting products also were injection molded as described with respect to Examples 2 to 16. The test results for these test specimens are reported in Table VII.

TABLE VI

| Example No. | Masterbatch | Preformed Single Phase Melt | Tm °C. | Hm J./g. | Tg °C. | Tc °C. | Hc J./g. | Viscosity 100 sec.$^{-1}$ | Melt Viscosity 1000 sec.$^{-1}$ | Melt Inherent Viscosity dl./g. |
|---|---|---|---|---|---|---|---|---|---|---|
| 27 | 10.2 | 5.1 | 290 | 6.1 | 130 | 237 | −5.5 | 554 | 204 | 0.95 |
| 28 | 10.2 | 5.1 | 293 | 6.0 | 130 | 244 | −5.6 | 320 | 134 | 0.95 |
| 29 | 10.2 | 5.1 | 299 | 6.4 | 131 | 248 | −5.7 | 605 | 214 | 1.2 |
| 30 | 10.2 | 5.1 | 298 | 5.8 | 132 | 246 | −5.2 | 522 | 188 | 1.2 |
| 31 | 10.1 | 5.05 | 298 | 5.4 | 133 | 246 | −5.9 | 830 | 385 | 1.09 |
| 32 | 10.1 | 5.05 | 307 | 6.7 | 134 | 259 | −5.8 | 748 | 241 | 1.16 |
| 33 | 10.0 | 5.0 | 300 | 6.5 | 132 | 251 | −6.0 | 401 | 152 | 0.96 |
| 34 | 10.0 | 5.0 | 300 | 7.2 | 132 | 252 | −5.5 | 460 | 166 | 0.94 |

TABLE VII

| Example Nos. | Tensile Strength × 1,000 psi | Tensile Modulus × 1,000,000 psi | Elongation Percent | Flexural Strength × 1,000 psi | Flexural Modulus × 1,000,000 psi | Notched Izod Impact Strength ft.-lb./in. | Heat Deflection Temperature in °C. @ 264 psi. |
|---|---|---|---|---|---|---|---|
| 27 + 28 | 17.3 | 1.83 | 1.11 | n.m. | n.m. | 1.7 | 208 |
| 28 + 30 | 18.7 | 1.86 | 1.26 | 24.38 | 1.89 | 1.3 | 231 |
| 31 + 32 | n.m. | n.m. | n.m. | n.m. | n.m. | 1.3 | 214 |
| 30 + 34 | 17.0 | 1.7 | 1.3 | 24.0 | 1.9 | 1.3 | 225 | n.m. = not measured

EXAMPLES 35 to 37

Three identical polymerization runs were carried out which were substantially the same as that of Example 1 with the exception that a minor concentration of an additional comonomer (i.e., 4,4'-biphenol) was charged to the reactor together with the other three monomers. More specifically, into the reactor were placed 290.1 grams (2.1 moles) of p-hydroxybenzoic acid, 185.0 grams (1.68 moles) of hydroquinone, 324.0 grams (1.95 moles) of isophthalic acid, and 55.9 grams (0.3 moles) of 4,4'-biphenol which upon polymerization were capable of forming poly[co(4-oxybenzoate/phenyleneisophthalate)] which included a minor concentration of recurring 4,4'-dioxybiphenyl units. 40.1 grams of preformed Poly[co(4-oxybenzoate/6-oxynaphthoate)] while in solid particulate form also were added to the reactor.

0.065 g. of potassium acetate catalyst and 643.8 grams (6.15 moles) of acetic anhydride were added to the reactor. The preformed polymer contained 73 mole percent of recurring 4-oxybenzoate units and 27 mole percent of recurring 6-oxynaphthoate units and exhibited an inherent viscosity of 7.0 dl./g. when dissolved in a concentration of 0.1 percent by weight in equal parts by volume of pentafluorophenol and hexafluoroisopropanol at 25° C. Such preformed polymer was present in the reactor in a concentration of 4.7 percent by weight based upon the total concentration of the four monomers which initially were present in the reaction zone.

The properties of the resulting products are reported in Table VIII. Monofilaments were melt extruded at 350° C. from a portion of the product of Example 36. When the resulting fibers were examined by thermo-optical microscopy, fine gels of the preformed poly[co(4-oxybenzoate/6-oxynaphthoate)] were observed within a matrix of the poly[co(4-oxybenzoate/phenyleneisophthalate)] containing the recurring 4,4′-dioxybiphenyl units.

The products were compounded with glass fiber reinforcement as described with respect to Examples 2 to 16 and were injection molded to form test specimens using a barrel temperature of 290° to 320° C. and a mold temperature of 100° C. The test results were as follows:

Tensile Strength=20,500 psi,
Tensile Modulus=1,840,000 psi,
Elongation=1.7 percent,
Notched Izod Impact Strength=1.2 ft.-lb/in., and
Heat Detection Temperature@264 psi=148° C.

More specifically, into the reactor were placed 304.6 grams (2.205 moles) of p-hydroxybenzoic acid, 228.9 grams (2.079 moles) of hydroquinone, 287.8 grams (1.7325 moles) of isophthalic acid, and 52.3 grams of terephthalic acid which upon polymerization were capable of forming poly[co(4-oxybenzoate/phenyleneisophthalate)] which includes a minor concentration of recurring terephthaloyl units. 0.066 grams of potassium acetate and 672.7 grams of acetic anhydride were added to the reactor. 88.1 grams of equal parts by weight of an intimate admixture of preformed poly[co(4-oxybenzoate/6-oxynaphthoate)] and preformed poly[co(4-oxybenzoate/phenyleneisophthalate)] were added to the reactor. Such intimate admixture was prepared by preliminarily forming the poly[co(4-oxybenzoate/phenyleneisophthalate)] in the presence of the preformed poly[co(4-oxybenzoate/6-oxynaphthoate)] in a manner similar to that previously described to form a uniform masterbatch or master blend of the two polymers. The preformed poly[co(4-oxybenzoate/6-oxynaphthoate)] contained 77 mole percent of recurring 4-oxybenzoate units and 23 mole percent of recurring 6-oxynaphthoate units and exhibited an inherent viscosity of 5.2 dl./g. when dissolved in a concentration of 0.1 percent by weight in equal parts by volume of pentafluorophenol and hexafluoroisopropanol at 25° C. The preformed poly[co(4-oxybenzoate/phenyleneisophthalate) was formed of monomers which were supplied in the same relative molar concentrations as described in Example 1. Properties of the resulting product are reported in Table IX. The properties of glass fiber-reinforced test specimens as described with respect to Examples 2 to 16 are reported in Table X.

TABLE VIII

| Example No. | Tm °C. | Hm J./g. | Tg °C. | Tc °C. | Hc J./g. | Melt Viscosity 100 sec.$^{-1}$ | Melt Viscosity 1000 sec.$^{-1}$ | Inherent Viscosity dl./g. |
|---|---|---|---|---|---|---|---|---|
| 35 | 275 | 3.1 | 133 | 222 | −4.2 | 687 | 232 | 1.41 |
| 36 | 275 | 2.6 | 134 | 222 | −3.8 | 530 | 183 | 1.47 |
| 37 | 275 | 2.5 | 136 | 223 | −3.2 | 796 | 263 | 1.48 |

EXAMPLES 38 and 39

TABLE IX

| Example No. | Masterbatch | Preformed Single Phase Melt | Tm °C. | Hm J./g. | Tg °C. | Tc °C. | Hc J./g. | Viscosity 100 sec.$^{-1}$ | Melt Viscosity 1000 sec.$^{-1}$ | Melt Inherent Viscosity dl./g. |
|---|---|---|---|---|---|---|---|---|---|---|
| 38 | 10.1 | 5.05 | 309 | 3.5 | 125 | 235 | −1.9 | 823 | 267 | 1.3 |
|   |   |   |   |   |   | 308 | −0.9 |   |   |   |
| 39 | 10.1 | 5.05 | 310 | 4.9 | 125 | 237 | −1.7 | 869 | 301 | 1.4 |
|   |   |   |   |   |   | 303 | −0.6 |   |   |   |

TABLE X

| Example Nos. | Tensile Strength × 1,000 psi | Tensile Modulus × 1,000,000 psi | Elongation Percent | Flexural Strength × 1,000 psi | Flexural Modulus × 1,000,000 psi | Notched Izod Impact Strength ft.-lb./in. | Heat Deflection Temperature in °C. @ 264 psi. |
|---|---|---|---|---|---|---|---|
| 38 + 39 Molded at 295° C. | 15.8 | 2.3 | 0.8 | 24.1 | 2.3 | 0.9 | 198 |
| 38 + 39 Molded at 310° C. | 16.7 | 2.4 | 0.8 | 26.3 | 2.3 | 1.1 | 207 |

Two identical polymerization runs were carried out which were substantially the same as that of Example 1 with the exception that a portion of the isophthalic acid monomer was replaced by terephthalic acid monomer.

EXAMPLES 40 and 41

Example I was substantially repeated two times with the exceptions indicated wherein a different preformed polymer which is capable of forming an anisotropic single phase melt was substituted for the poly[co(4-oxybenzoate/6-oxynaphthoate)]. Such preformed polymer was a poly(ester-amide) formed in accordance with the teachings of U.S. Pat. No. 4,330,457, and contained recurring 6-oxy-2-naphthoyl units, terephthaloyl units, and p-aminophenoxy units.

More specifically, into the reactor were placed 321.5 grams (2.3275 moles) of p-hydroxybenzoic acid, 241.6 grams (2.1945 moles including a 0.5 percent molar excess) of hydroquinone, and 359.1 grams (2.16125 moles) of isophthalic acid. 52.5 grams of the poly(ester-amide) which exhibited an inherent viscosity of 4.7 dl./g. when dissolved in a concentration of 0.1 percent by weight in equal parts by volume of pentafluorophenol and hexafluoroisopropanol measured at 25° C. were added to the reactor together with 0.07 gram of potassium acetate catalyst and 710.1 grams of acetic anhydride. The properties of the resulting products are reported in Table XI. The properties of glass fiber-reinforced test specimens as described with respect to Examples 2 to 16 are reported in Table XII.

ity of 2.8 dl./g. when dissolved in a concentration of 0.1 percent by weight in equal parts by volume of pentafluorophenol and hexafluoroisopropanol at 25° C. In Examples 44 and 45 the molar ratios of these units were 50:25:25 respectively, and the wholly aromatic polyester exhibited an inherent viscosity of 6.0 dl./g. prior to being intimately admixed with an equal weight of preformed poly[co(4-oxybenzoate/phenyleneisophthalate)]. Such intimate admixture was prepared by preliminarily forming the poly[co(4-oxybenzoate/phenyleneisophthalate)] in the presence of the preformed wholly aromatic polyester in a manner similar to that previously described to form a masterbatch. The monomers used for preparing the preformed poly[co(4-oxybenzoate/phenyleneisophthalate)] were supplied in the same relative molar concentrations as described in Example 1.

More specifically, in each of Examples 42 to 45 to the reactor were added 321.5 grams (2.3275 grams) of p-hydroxybenzoic acid, 241.6 grams (2.1945 moles) of hydroquinone, 359.1 grams (2.16125 moles) of isophthalic acid, 0.07 gram of potassium acetate catalyst,

TABLE XI

| Example No. | Preformed Single Phase Melt | Tm °C. | Hm J./g. | Tg °C. | Tc °C. | Hc J./g. | Viscosity 100 sec.$^{-1}$ | Melt Viscosity 1000 sec.$^{-1}$ | Melt Inherent Viscosity dl./g. |
|---|---|---|---|---|---|---|---|---|---|
| 40 | 5.7 | 297 | 3.3 | 137 | 226 | −2.6 | 592 | 201 | 1.1 |
| 41 | 5.7 | 296 | 3.7 | 135 | 230 | −3.1 | 403 | 145 | 1.0 |

TABLE XII

| Example Nos. | Tensile Strength × 1,000 psi | Tensile Modulus × 1,000,000 psi | Elongation Percent | Flexural Strength × 1,000 psi | Flexural Modulus × 1,000,000 psi | Notched Izod Impact Strength ft.-lb./in. | Heat Deflection Temperature in °C. @ 264 psi. |
|---|---|---|---|---|---|---|---|
| 40 + 41 Molded at 295° C. | 16.1 | 1.7 | 1.2 | 24.6 | 1.8 | 1.1 | 187 |
| 40 + 41 Molded at 310° C. | 19.1 | 1.8 | 1.3 | 27.3 | 1.8 | 1.2 | 179 |

EXAMPLES 42 to 45

Example 1 was substantially repeated with the exceptions indicated wherein a different preformed polymer which is capable of forming an anisotropic single phase melt was substituted for the poly[co(4-oxybenzoate/6-oxynaphthoate)]. Such preformed polymer which was capable of forming an anisotropic single phase melt was a wholly aromatic polyester formed in accordance with U.S. Pat. No. 4,256,624, and contained recurring 6-oxy-2-naphthoyl units, terephthaloyl units, and 1,4-dioxyphenylene units. In Examples 42 and 43, the molar ratios of these units were 60:20:20 respectively, and the wholly aromatic polyester exhibited an inherent viscosand 710.1 grams of acetic anhydride. In Examples 42 and 43, 52.6 grams of the wholly aromatic polyester were added to the reactor which provided the preformed polymer in a concentration of 5.7 percent by weight based on the total concentration of monomers present. In Examples 44 and 45, 46.4 grams of the masterbatch were added to the reactor which provided the preformed polymer in a concentration of 2.5 percent by weight based on the total concentration of monomers present. The properties of the resulting products are reported in Table XIII. The properties of glass fiber-reinforced test specimens as described with respect to Examples 2 to 16 are reported in Table XIV.

TABLE XIII

| Example No. | Masterbatch | Preformed Single Phase Melt | Tm °C. | Hm J./g. | Tg °C. | Tc °C. | Hc J./g. | Viscosity 100 sec.$^{-1}$ | Melt Viscosity 1000 sec.$^{-1}$ | Melt Inherent Viscosity dl./g. |
|---|---|---|---|---|---|---|---|---|---|---|
| 42 | — | 5.7 | 294 | 4.5 | 131 | 235 | −4.9 | 349 | 136 | 0.9 |
| 43 | — | 5.7 | 300 | 4.9 | 129 | 236 | −5.5 | 327 | 116 | 0.8 |
| 44 | 5.0 | 2.5 | 293 308 | 6.2 | 132 | 240 | −5.7 | 486 | 175 | 0.7 |
| 45 | 5.0 | 2.5 | 298 | 6.1 | 130 | 236 | −7.2 | 289 | 106 | 0.5 |

TABLE XIV

| Example Nos. | Tensile Strength × 1,000 psi | Tensile Modulus × 1,000,000 psi | Elongation Percent | Flexural Strength × 1,000 psi | Flexural Modulus × 1,000,000 psi | Notched Izod Impact Strength ft.-lb./in. | Heat Deflection Temperature in °C. @ 264 psi. |
|---|---|---|---|---|---|---|---|
| 42 + 43 | 18.7 | 1.8 | 1.3 | 26.9 | 1.9 | 1.5 | 203 |
| 44 + 45 | 18.5 | 1.9 | 1.2 | 24.1 | 1.9 | 1.5 | 206 |

EXAMPLES 46 to 49

Example 1 was substantially repeated with the exceptions indicated wherein a different preformed polymer which is capable of forming an anisotropic single phase melt was substituted for the poly[co(4-oxybenzoate/6-oxynaphthoate)]. Such preformed polymer was a wholly aromatic polyester formed in accordance with U.S. Pat. No. 4,473,682, and contained recurring 4-oxybenzoyl units, 6-oxy-2-naphthoyl units, 4,4'-dioxybiphenyl units, and terephthaloyl units. In each of Examples 46 to 49, the molar ratios of these units were 50:10:20:20 respectively, and the wholly aromatic polyester exhibited an inherent viscosity of 4.3 dl./g. when dissolved in a concentration of 0.1 percent by weight of equal parts by volume of pentafluorophenol and hexafluoroisopropanol at 25° C.

In Examples 46 and 47, into the reactor were placed 274.01 grams (1.995 moles) of p-hydroxybenzoic acid, 205.95 grams (1.8639 moles including a 0.2 mole percent excess) of hydroquinone, 306.04 grams (1.8525 moles) of isophthalic acid, 42 grams of the preformed wholly aromatic polyester, 0.06 gram of potassium acetate catalyst, and 608.1 grams of acetic anhydride. The preformed wholly aromatic polyester was provided in a concentration of 5.3 percent by weight based on the total concentration of the monomers present.

In Examples 48 and 49, into the reactor were placed 260.1 grams (1.89 moles) of p-hydroxybenzoic acid, 195.5 grams (1.7658 moles including an 0.2 mole excess) of hydroquinone, 290.5 grams (1.755 moles) of isophthalic acid, 80.7 grams of an intimate admixture of equal parts by weight of preformed poly[co(4-oxybenzoate/phenyleneisophthalate)] and the wholly aromatic polyester, 0.06 gram of potassium acetate catalyst, and 577.2 grams of acetic anhydride. Such intimate admixture was prepared by preliminarily forming the poly[co(4-oxybenzoate/phenyleneisophthalate)] in the presence of the preformed wholly aromatic polyester in a manner similar to that previously described to form a masterbatch. The monomers used for preparing the preformed poly[co(4-oxybenzoate/phenyleneisophthalate)] were supplied in the same relative molar concentrations as described in Example 1. In Examples 48 and 49 the preformed wholly aromatic polyester capable of forming an anisotropic single phase melt was provided in a concentration of 5.4 percent by weight based on the total concentrations of the monomers present.

The properties of the resulting products are reported in Table XV. The properties of glass fiber-reinforced test specimens as described with respect to Examples 2 to 16 are reported in Table XVI.

TABLE XV

| Example No. | Masterbatch | Preformed Single Phase Melt | Tm °C. | Tg °C. | Tc °C. | Melt Viscosity 100 sec.$^{-1}$ | Melt Viscosity 1000 sec.$^{-1}$ | Inherent Viscosity dl./g. |
|---|---|---|---|---|---|---|---|---|
| 46 | — | 5.3 | 273.9 | 116.8 | 250.1 | 424 | 150 | 1.17 |
| 47 | — | 5.3 | 277.0 | 116.6 | 250.3 | 519 | 182 | 1.16 |
| 48 | 10.8 | 5.4 | 274.1 | 117.0 | 247.9 | 426 | 149 | 0.9 |
| 49 | 10.8 | 5.4 | 271.9 | 117.1 | 247.3 | 393 | 141 | 0.86 |

TABLE XVI

| Example Nos. | Tensile Strength × 1,000 psi | Tensile Modulus × 1,000,000 psi | Elongation Percent | Flexural Strength × 1,000 psi | Flexural Modulus × 1,000,000 psi | Notched Izod Impact Strength ft.-lb./in. | Heat Deflection Temperature in °C. @ 264 psi. |
|---|---|---|---|---|---|---|---|
| 46 + 47 Molded at 300° C. | 15.9 | 1.8 | 1.0 | 22.3 | 1.8 | 1.1 | 227 |
| 46 + 47 Molded at 315° C. | 18.5 | 2.0 | 1.2 | n.m. | n.m. | n.m. | 225 |
| 48 + 49 Molded at 300° C. | 18.7 | 2.0 | 1.2 | 24.8 | 1.9 | 1.5 | 208 |
| 48 + 49 Molded at 315° C. | 20.7 | 2.1 | 1.3 | 25.8 | 1.9 | 1.6 | 206 | n.m. = not measured

EXAMPLES 50 to 53

Example 1 was substantially repeated with the exceptions indicated wherein a different preformed polymer which is capable of forming an anisotropic single phase melt was substituted for the poly[co(4-oxybenzoate/6-oxynaphthoate)]. Such preformed polymer was a wholly aromatic polyester which contained recurring 4-oxybenzoyl units, 1,4-dioxy-2-phenyl phenylene units, and terephthaloyl units. The molar ratios of these units were 10:45:45 respectively, and the wholly aromatic polyester exhibited an inherent viscosity of 2.7 dl./g. when dissolved in a concentration of 0.1 percent by weight in equal parts by volume of pentafluorophenol and hexafluoroisopropanol at 25° C.

In Examples 50 and 51, into the reactor were charged 367.4 grams (2.66 moles) of p-hydroxybenzoic acid, 273.6 grams (2.4852 moles including a 0.2 mole percent excess) of hydroquinone, 410.4 grams (2.47 moles) of isophthalic acid, 61.7 grams of preformed wholly aromatic polyester, 0.08 gram of potassium acetate catalyst, and 811.5 grams of acetic anhydride. The wholly aromatic polyester was provided in a concentration of 5.9 percent by weight based on the total concentration of the monomers present.

In Examples 52 and 53, into the reactor were charged 348.1 grams (2.52 moles) of p-hydroxybenzoic acid, 259.2 grams (2.3544 moles including a 0.2 mole percent excess) of hydroquinone, 388.8 grams (2.34 moles) of isophthalic acid, 109.8 grams an intimate admixture of equal parts by weight of preformed poly[co(4-oxybenzoate/phenyleneisophthalate)] and the wholly aromatic polyester, 0.075 gram of potassium acetate catalyst, and 768.8 grams of acetic anhydride. Such intimate admixture was prepared by preliminarily forming the poly[co(4-oxybenzoate/phenyleneisophthalate)] in the presence of the preformed wholly aromatic polyester in a manner similar to that previously described to form a masterbatch. The monomers used for preparing the preformed poly[co(4-oxybenzoate/phenyleneisophthalate)] were supplied in the same relative molar concentrations as described in Example 1. In Examples 52 and 53 the preformed wholly aromatic polyester capable of forming an anisotropic single phase melt was provided in a concentration 5.5 percent by weight based on the total concentration of the monomers present.

The properties of the resulting products are reported in Table XVII. The properties of glass fiber-reinforced test specimens as described with respect to Examples 2 to 16 are reported in Table XVIII.

EXAMPLES 54 to 57

Example 1 was substantially repeated with the exceptions indicated wherein the poly[co(4-oxybenzoate/6-oxynaphthoate)] was introduced in two different relatively low concentrations while intimately admixed with an equal part by weight of preformed poly[co(4-oxybenzoate/phenyleneisophthalate)]. Such intimate admixtures were prepared by preliminarily forming the poly[co(4-oxybenzoate/phenyleneisophthalate)] in the presence of the preformed wholly aromatic polyester in a manner similar to that previously described to form a masterbatch. The monomers used when preparing the preformed poly[co(4-oxybenzoate/phenyleneisophthalate)] were supplied in the same molar concentrations as described in Example 1.

In Examples 54 and 55, into the reactor were charged 379.0 grams (2,744 moles) of p-hydroxybenzoic acid, 282.3 grams (2.56368 moles including a 0.2 mole percent excess) of hydroquinone, 423.3 grams (2,548 moles) of isophthalic acid, 20.3 grams of the masterbatch, 0,082 gram of potassium acetate, and 837.2 grams of acetic anhydride. The preformed poly[co(4-oxybenzoate/6-oxynaphthoate)] was provided in a concentration of 0.95 percent by weight based on the total concentration of the monomers present. The nature of the product is illustrated in FIGS. 2A, 2B, 2C, and 2D.

Figure 3B:
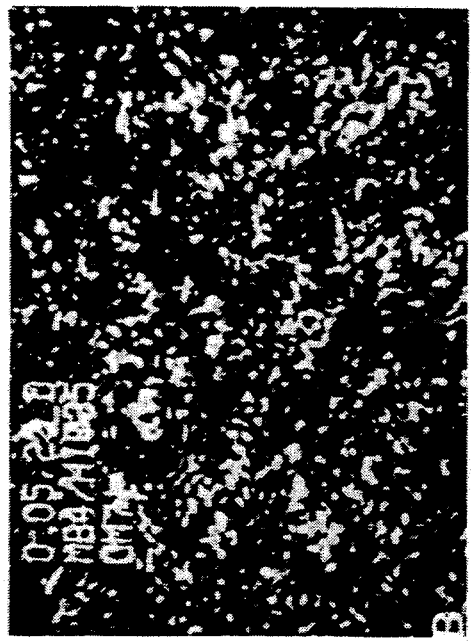
Figure 3D:
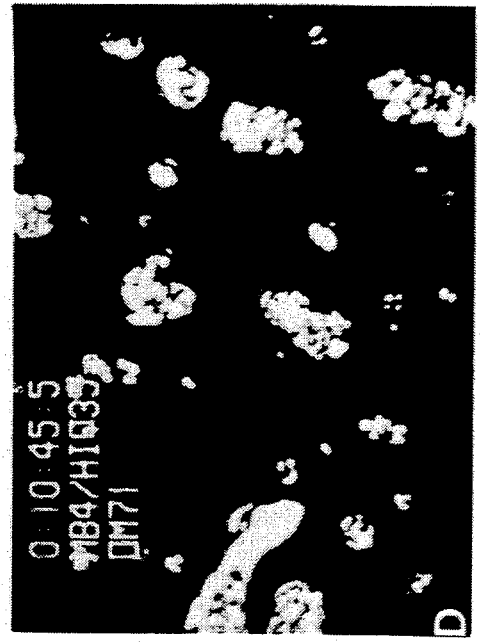
Figure 3A:
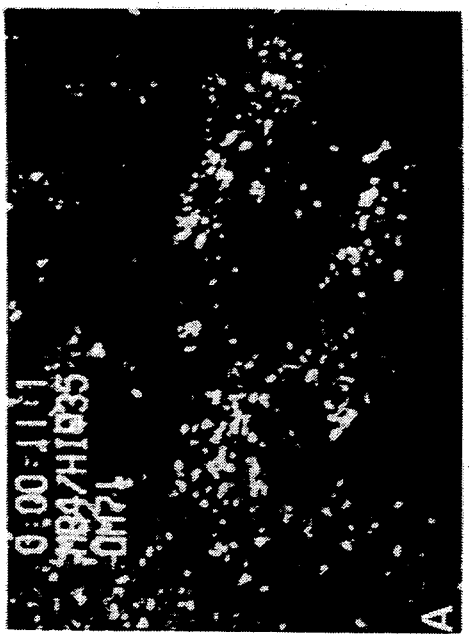
Figure 3C:
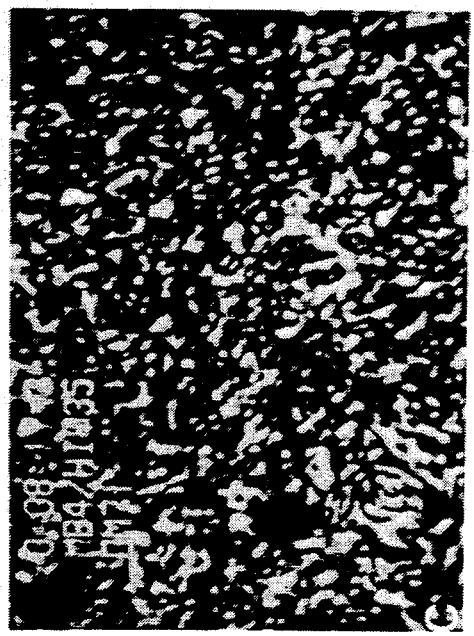
Figure 4A:
Figure 4B:
Figure 4C:
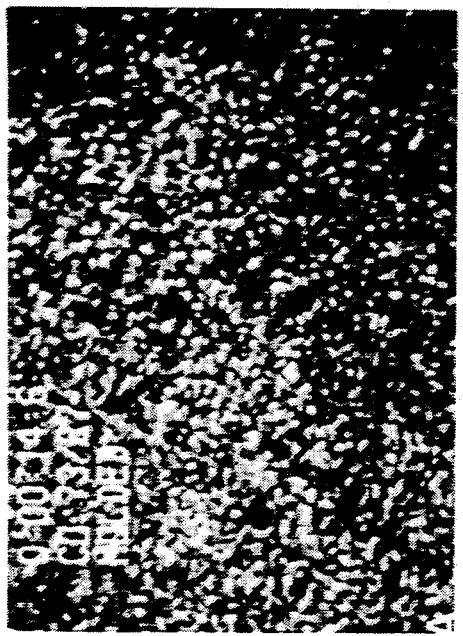
Figure 4D:

In Examples 56 and 57, into the reactor were charged 371.3 grams (2,688 moles) of p-hydroxybenzoic acid, 276.5 grams (2.51136 moles including a 0.2 mole percent excess) of hydroquinone, 414.7grams (2,496 moles) of isophthalic acid, 40.6 grams of the masterbatch, 0.08 gram of potassium acetate, and 820.0 grams of acetic anhydride. The preformed poly[co(4-oxybenzoate/6-oxynaphthoate)] was provided in a concentration of 1.9 percent by weight based on the total concentration of the monomers present. The nature of the product is illustrated in FIGS. 3A, 3B, 3C, and 3D.

TABLE XVII

| Example No. | Masterbatch | Preformed Single Phase Melt | Tm °C. | Tg °C. | Tc °C. | Melt Viscosity 100 sec.$^{-1}$ | Melt Viscosity 1000 sec.$^{-1}$ | Inherent Viscosity dl./g. |
|---|---|---|---|---|---|---|---|---|
| 50 | — | 5.9 | 275 286 | 130 | 236.5 | 1988 | 748 | 0.79 |
| 51 | — | 5.9 | 270 283.6 | 125 | 237.4 | 970 | 411 | 0.69 |
| 52 | 11 | 5.5 | 281 304 | 131 | 241 | 4430 | 1281 | 0.86 |
| 53 | 11 | 5.5 | 279 309 | 131 | 241 | 2386 | 806 | 0.79 |

TABLE XVIII

| Example Nos. | Tensile Strength × 1,000 psi | Tensile Modulus × 1,000,000 psi | Elongation Percent | Flexural Strength × 1,000 psi | Flexural Modulus × 1,000,000 psi | Notched Izod Impact Strength ft.-lb./in. | Heat Deflection Temperature in °C. @ 264 psi. |
|---|---|---|---|---|---|---|---|
| 50 + 51 Molded at 300° C. | n.m. | n.m. | n.m. | n.m. | n.m. | 1.0 | 168 |
| 50 + 51 Molded at 315° C. | 17.7 | 2.1 | 0.9 | n.m. | n.m. | 1.1 | 171 |
| 52 + 53 Molded at 300° C. | 15.2 | 2.7 | 0.8 | n.m. | n.m. | 1.0 | 165 |
| 52 + 53 Molded at 315° C. | 18.1 | 2.2 | 1.0 | 22.9 | 2.0 | 1.0 | 190 | n.m. = not measured

The properties of the resulting products are reported in Table XIX. The properties of the glass fiber-reinforced test specimens as described with respect to Examples 2 to 16 are reported in Table XX.

TABLE XIX

| Example No. | Masterbatch | Preformed Single Phase Melt | Tm °C. | Tg °C. | Tc °C. | Melt Viscosity 100 sec.$^{-1}$ | Melt Viscosity 1000 sec.$^{-1}$ | Inherent Viscosity dl./g. |
|---|---|---|---|---|---|---|---|---|
| 54 | 1.9 | 0.95 | 299 314 | 132 | 253 | 427 | 163 | 0.8 |
| 55 | 1.9 | 0.95 | 276 296 310 | 127 | 239 | 279 | 110 | 0.74 |
| 56 | 3.8 | 1.9 | 292 306 324 | 130 | 252 | 293 | 116 | 0.61 |
| 57 | 3.8 | 1.9 | 294 303 | 131 | 252 | 426 | 164 | 0.81 |

TABLE XX

| Example Nos. | Tensile Strength × 1,000 psi | Tensile Modulus × 1,000,000 psi | Elongation Percent | Notched Izod Impact Strength ft.-lb./in. | Heat Deflection Temperature in °C. @ 264 psi. |
|---|---|---|---|---|---|
| 54 + 55 Molded at 300° C. | 12.4 | 1.8 | 0.8 | 1.1 | 200 |
| 54 + 55 Molded at 315° C. | 16.9 | 2.0 | 1.0 | 1.2 | 200 |
| 56 + 57 Molded at 300° C. | 13.1 | 1.8 | 0.8 | 1.2 | 201 |
| 56 + 57 Molded at 315° C. | 17.3 | 2.0 | 1.0 | 1.3 | 215 |

EXAMPLES 58 and 59

Example 1 was substantially repeated with the exceptions indicated wherein the preformed poly[co(4-oxybenzoate/6-oxynaphthoate)] was prepared in accordance with the teachings of U.S. Pat. No. 4,539,386. More specifically, when the preformed poly[co(4-oxybenzoate/6-oxynaphthoate)] was formed recurring terephthaloyl units derived from terephthalic acid were introduced in a concentration of 3 mole percent together with 78.5 mole percent of 4-oxybenzoyl units and 18.5 mole percent of 6-oxy-2-naphthoyl units. The preformed polymer was not sufficiently soluble to carry out the standard inherent viscosity determination. The prepolymer was substantially incapable of undergoing additional chain growth upon heating since the polymer chains were caused to terminate in carboxylic acid end groups during the course of its polymerization reaction.

In Example 58 into the reactor were charged 688.9 grams (4.9875 moles) of p-hydroxybenzoic acid, 513.1 grams (4.65975 moles including a 0.2 mole percent excess) of hydroquinone, 769.4 grams (4.63125 moles) of isophthalic acid, 97.3 grams of preformed poly[co(4-oxybenzoate/6-oxynaphthoate)], 0.6 gram of potassium acetate, and 1521.6 grams of acetic acid. The poly[co(4-oxybenzoate/6-oxynaphthoate)] was provided in a concentration of 4.9 percent by weight based on the total concentration of monomers present.

In Example 59 the poly[co(4-oxybenzoate/6-oxynaphthoate)] was introduced while intimately admixed with an equal part by weight of preformed poly[co(4-oxybenzoate/phenyleneisophthalate)]. Such intimate admixture was prepared by preliminarily forming the poly[co(4-oxybenzoate/phenyleneisophthalate)] in the presence of the preformed poly[co(4-oxybenzoate/6-oxynaphthoate)] in a manner similar to that previously described to form a masterbatch. The monomers used when preparing the preformed poly[co(4-oxybenzoate/phenyleneisophthalate)] were supplied in the same molar concentrations as described in Example 1.

In Example 59 into the reactor were charged 652.7 grams (4.725 moles) of p-hydroxybenzoic acid, 486.1 grams (4.4145 moles including 0.2 mole percent excess) of hydroquinone, 728.9 grams (4.3815 moles) of isophthalic acid, 187.4 grams of the masterbatch, 0.56 gram of potassium acetate, and 1441.5 grams of acetic anhydride. The poly[co(4-oxybenzoate/6-oxynaphthoate)] was provided in a concentration of 5.0 percent by weight based on the total concentration of monomers present.

The properties of the resulting products are reported in Table XXI. The properties of glass fiber-reinforced test specimens as described with respect to Examples 2 to 16 are reported in Table XXII.

TABLE XXI

| Example No. | Masterbatch | Preformed Single Phase Melt | Tm °C. | Hm J./g. | Tg °C. | Tc °C. | Hc J./g. | Viscosity 100 sec.$^{-1}$ | Melt Viscosity 1000 sec.$^{-1}$ | Melt Inherent Viscosity dl./g. |
|---|---|---|---|---|---|---|---|---|---|---|
| 58 |  | 4.9 | 297 315 | 7.6 | 127 | 242 | −6.5 | 785 | 253 | 0.8 |
| 59 | 10 | 5.0 | 300.5 | 5.8 | 128 | 249 | -6.2 | 549 | 192 | 0.8 |

TABLE XXII

| Example Nos. | Tensile Strength × 1,000 psi | Tensile Modulus × 1,000,000 psi | Elongation Percent | Flexural Strength × 1,000 psi | Flexural Modulus × 1,000,000 psi | Notched Izod Impact Strength ft.-lb./in. | Heat Deflection Temperature in °C. @ 264 psi. |
|---|---|---|---|---|---|---|---|
| 58 Molded at 300° C. | 15.6 | 1.8 | 1.0 | 22.1 | 1.8 | 1.3 | 221 |
| 58 Molded at 310° C. | 17.3 | 1.9 | 1.1 | 22.5 | 1.8 | 1.5 | 219 |
| 59 Molded at 300° C. | 16.4 | 2.0 | 0.9 | 22.5 | 1.9 | 1.4 | 221 |
| 59 Molded at 310° C. | 18.8 | 2.1 | 1.1 | 23.1 | 1.9 | 1.5 | 222 |

Example 60

4-Hydroxybenzoic acid (2.12 moles), terephthalic acid (0.928 moles), 4,4'-biphenol (0.928 moles), potassium acetate (0.82 mmoles) and poly[co(4-oxybenzoate/6-oxy-2-naphthoate)], derived from 4-hydroxybenzoic acid (80 mole %) and 2-hydroxy-6-naphthoic acid (20 mole %) (1.33 moles of polymer based on the two comonomers) were combined in a 2-liter 3-necked flask equipped with a Vigreaux Column and condenser, nitrogen inlet, thermocouple and a C-shaped stainless steel stirrer. The system was de-aerated with three vacuum-nitrogen purge cycles before the addition of acetic anhydride (4.14 moles). The flask was then heated in a fluidized sand bath while purging with nitrogen. The system was heated to 125° C. over 50 minutes, to 140° C. over 40 minutes, to 150° C. over 20 minutes, to 200° C. over 45 minutes, to 210° C. over 5 minutes, to 220° C. over 6 minutes, to 280° C. over 50 minutes, to 320° C. over 80 minutes, to 350° C. over 20 minutes, to 360° C. over 10 minutes, and to 370° C., over 20 minutes. While maintaining the temperature at 370° C., the system was slowly evacuated (in 100 mbar increments). The reading of the torque indicator was noted at the beginning of this vacuum period. Under vacuum at 370° C. the viscosity of the polymer increased as reflected by the reading on the torque indicator (Cole Parmer Master Servodyne). When the increase in torque reached a predetermined level (change in torque, 70 mv) the vacuum was released while nitrogen was purged into the system. The system was taken down and the polymer was allowed to cool. The polymer plug was removed by breaking the flask, cut into pieces and then ground into small particles. The polymer had an I.V. (measured at 25° C. as a 0.1% by weight solution in equal parts by volume of pentafluorophenol and hexafluoroisopropanol) of 9.0 dl/g and a melting temperature of 349° C. (by DSC). The melt viscosity of the polymer at 380° C., as determined on a Kayeness Capillary Rheometer, was 2120 poise at 100 sec$^1$ and 555 poise at 1000 sec$^{-1}$.

A portion of the product was filled with 30% chopped glass reinforcing fibers for injection molding of standard test specimens for physical testing. Tests were carried out as summarized in Examples 2 to 16. The test results are summarized in Table XXIII.

EXAMPLE 61

A composition was made using about the same monomer ratios as were used in Example 60. In this example, the monomers that yield the preformed thermotropic liquid crystalline polymer were used rather than the polymer itself. Thus, 6-hydroxy-2-naphthoic acid (5 parts on a mole basis), 4-hydroxybenzoic acid (60 parts), 4,4'-biphenol (17.5 parts), terephthalic acid (17.5 parts) and potassium acetate (enough to yield 60 ppm potassium in the final polymer) were combined with acetic anhydride (about 105 parts on a mole basis) in the same reaction vessel as in Example 60 and then heated according to the following temperature program: 125° C. over 50 minutes, 140° C. over 40 minutes, 150° C. over 20 minutes, 200° C. over 45 minutes, 210° C. over 5 minutes, 220° C. over 6 minutes, 275° C. over 50 minutes, 310° C. over 70 minutes, 335° C over 25 minutes, and 350° C. over about 45 to 55 minutes. The system was then evacuated in 100 mbar increments at 350° C. Under vacuum at 350° C., the reading on the torque indicator was noted. The reaction was stirred under vacuum at 350° C. until the torque reading increased by 35–38 mv. The vacuum was then released, nitrogen was admitted, and the polymer was allowed to cool. Properties of the polymer were then measured as in Example 60. The data are shown in Table XXIII.

TABLE XXIII

|  | Example 60 | Example 61 |
|---|---|---|
| Melting Point, °C. | 349–51 | 345–7 |
| Process Range, °C. | 330–40 | 320–30 |
| Heat Deflection Temperature @ 264 psi, °C.* | 257 | 251–8 |
| Melt Viscosity (@ 1000 sec$^{-1}$), poise | 346–555 @ 380° C. | 265–272 @ 345° C. |
| Tensile Strength, kpsi* | 18.8–20.3 | 19.8–22.1 |
| Tensile Modulus, Mpsi* | 2.12–2.14 | 1.93–2.13 |
| Elongation, %* | 1.5–1.7 | 1.9–2.0 |
| Flex Strength, kpsi* | 26.1–27.4 | 26.2–26.9 |
| Flex Modulus, Mpsi* | 1.99–2.11 | 1.70 |
| Notched Izod, ft-lb/in* | 1.7–1.8 | 1.9–2.0 |

*Measured on 30% glass-filled materials.

Although the invention has been described with preferred embodiments it is to be understood that variations and modifications may be employed without departing from the concept of the invention defined in the following claims.

We claim:

1. A method for producing a liquid crystalline polymer blend comprising the steps of: (a) mixing a preformed thermotropic liquid crystalline polymer with the reactants necessary to form a second liquid crystalline polymer, wherein said second liquid crystalline polymer is an aromatic polyester, said reactants necessary to form said second liquid crystalline polymer comprising aromatic molecules, each having substituents capable of reacting to from aromatic ester linkages;

and (b) heating the mixture of said reactants and said preformed thermotropic liquid crystalline polymer above the melting temperature of said preformed liquid crystalline polymer at a temperature and for a time period sufficient for said reactants to combine to form said second liquid crystalline polymer in a uniform blend with said preformed thermotropic liquid crystalline polymer.

2. A method for producing a liquid crystalline polymer blend as recited in claim 1, wherein said preformed thermotropic liquid crystalline polymer comprises a blend of at least two liquid crystalline polymers, one component of said blend optionally being said second liquid crystalline polymer.

3. The method as recited in claim 1, wherein said preformed thermotropic liquid crystalline polymer is provided in a concentration of about 0.5% to about 70% by weight of the liquid crystalline polymer blend.

4. The method as recited in claim 1, wherein said preformed thermotropic liquid crystalline polymer is provided in a concentration of about 2% to about 50% by weight of the liquid crystalline polymer blend.

5. The method of claim 1, wherein said preformed thermotropic liquid crystalline polymer is selected from the group consisting of aromatic polyesters, aliphatic-aromatic polyesters, poly(ester-amides), poly(ester-carbonates) and mixtures thereof.

6. The method as recited in claim 5, wherein said preformed thermotropic aromatic polyester comprises at least about 10% of recurring units which include a naphthalene moiety.

7. The method as recited in claim 1, wherein said preformed thermotropic liquid crystalline polymer is an aromatic polyester comprising at least one repeat unit derived from a monomer selected from the group consisting of 6-hydroxy-2-naphthoic acid, 2,6-dihydroxynaphthalene, 2,6-naphthalenedicarboxylic acid, 4-hydroxybenzoic acid, 1,4-hydroquinone, terephthalic acid and isophthalic acid.

8. The method as recited in claim 1, wherein said preformed thermotropic liquid crystalline polymer comprises 6-oxy-2-naphthoyl and 4-oxybenzoyl molecular repeat units.

9. The method as recited in claim 8, wherein said second liquid crystalline polymer is a polyester comprising 4,4'-dioxybiphenylene, 4-oxybenzoyl and terephthaloyl molecular repeat units.

10. The method as recited in claim 8, wherein said second liquid crystalline polymer is poly[co(4-oxybenzoate/1,4-phenyleneisophthalate)].

11. The method was recited in claim 1, wherein said preformed thermotropic liquid crystalline polymer comprises 6-oxy-2-naphthoyl, terephthaloyl and p-aminophenoxy repeat units.

12. The method as recited in claim 1 wherein said preformed thermotropic liquid crystalline polymer comprises 6-oxy-2-naphthoyl repeat units, terephthaloyl repeat units, optional 4-oxybenzoyl repeat units, and at least one repeat unit selected from the group consisting of 1,4-dioxyphenylene, 4,4'-dioxybiphenylene and substituted derivatives thereof.

13. The method as recited in claim 1 wherein said preformed thermotropic liquid crystalline polymer comprises 4-oxybenzoyl, terephthaloyl and 1,4-dioxy-2-phenylphenylene molecular repeat units.

14. The method as recited in claim 1, wherein said second liquid crystalline polymer forms a biphasic melt, one phase of said biphasic melt being anisotropic.

15. The method as recited in claim 1, wherein said second liquid crystalline polymer comprises 4-oxybenzoyl, isophthaloyl, 1,4-dioxyphenylene, optional terephthaloyl, and optional 4,4'-dioxybiphenylene molecular repeat units.

16. The method as recited in claim 1, wherein said second liquid crystalline polymer is poly[co(4-oxybenzoate/1,4-phenyleneisophthalate)].

17. The method as recited in claim 1, wherein said second liquid crystalline polymer is formed by melt acidolysis polymerization.

18. The method as recited in claim 17, wherein said reactants necessary to form said second liquid crystalline polymer comprise sufficient acetic anhydride to esterify the phenolic groups to acetate groups before said aromatic ester linkages are formed.

19. The method as recited in claim 1, wherein said preformed thermotropic liquid crystalline polymer is provided in a concentration of about 3% to about 10% by weight of the liquid crystalline polymer blend.

20. The method as recited in claim 1, wherein said temperature is in the range of about 200° C. to about 400° C.

21. The method as recited in claim 1, wherein said temperature does not exceed about 350° C.

22. In a process for the preparation of poly[co(4-oxybenzoate/phenyleneisophthalate)] in a stirred heated reaction zone via melt-acidolysis polymerization reaction of appropriate monomers, the improvement of providing in said reaction zone during a substantial portion of said polymerization in a well-dispersed form approximately 0.5 to 15 percent by weight of molten preformed polymer selected from the group consisting of anisotropic melt-forming poly(ester-amides), anisotropic melt-forming poly(ester-carbonates), anisotropic melt-forming wholly aromatic polyesters containing recurring units which include a naphthalene moiety, and mixtures thereof which is capable of forming an anisotropic single phase melt with the concentration of said preformed polymer being based upon the total concentration of monomers initially present in said reaction zone.

* * * * *